United States Patent [19]

Comfort et al.

[11] 4,363,096

[45] Dec. 7, 1982

[54] ARBITRATION CONTROLLER PROVIDING FOR ACCESS OF A COMMON RESOURCE BY A DUPLEX PLURALITY OF CENTRAL PROCESSING UNITS

[75] Inventors: Joseph A. Comfort; Thomas J. Perry; Michel Loos, all of Phoeniz, Ariz.

[73] Assignee: GTE Automatic Electric Labs Inc., Northlake, Ill.

[21] Appl. No.: 163,044

[22] Filed: Jun. 26, 1980

[51] Int. Cl.³ .................. G06F 13/00; G06F 15/16
[52] U.S. Cl. .................................................. 364/200
[58] Field of Search ... 364/200 MS File, 900 MS File, 364/187; 371/9

[56] References Cited

U.S. PATENT DOCUMENTS

| | | | |
|---|---|---|---|
| 3,303,474 | 2/1967 | Moore et al. | 371/9 X |
| 3,444,528 | 5/1969 | Lovell et al. | 371/9 |
| 3,521,238 | 7/1970 | Gunderson | 364/200 |
| 3,636,331 | 1/1972 | Amrehn | 364/187 |
| 3,699,529 | 10/1972 | Beyers et al. | 364/200 |
| 3,806,885 | 4/1974 | Moore | 364/200 |
| 3,882,455 | 5/1975 | Heck et al. | 371/9 |
| 4,096,571 | 6/1978 | Vander Mey | 364/200 |
| 4,133,027 | 1/1979 | Hogan | 364/187 |
| 4,141,066 | 2/1979 | Keiles | 364/187 X |
| 4,159,518 | 6/1979 | Draper et al. | 364/200 |
| 4,164,787 | 8/1979 | Araguren | 364/200 |
| 4,171,536 | 10/1979 | Heuer et al. | 364/200 |
| 4,191,996 | 3/1980 | Chesley | 371/9 |
| 4,228,496 | 10/1980 | Katzman et al. | 364/200 |

FOREIGN PATENT DOCUMENTS

| | | | |
|---|---|---|---|
| 54-159839 | 12/1979 | Japan | 371/9 |
| 2032149 | 4/1980 | United Kingdom | 371/9 |

*Primary Examiner*—Mark E. Nusbaum
*Assistant Examiner*—William G. Niessen
*Attorney, Agent, or Firm*—Robert J. Black; Frank J. Bogacz

[57] ABSTRACT

An arbitration controller providing for equal priority sharing of duplicate copy resources by a duplex plurality of central processing units. Conflicts resulting from simultaneous requests from several CPU's for access to the common resource are resolved at a high rate of speed. In addition, an approximately statistically equal probability is maintained for access of the common resource by all the central processing units.

8 Claims, 2 Drawing Figures

ARBITRATION CONTROLLER PROVIDING FOR ACCESS OF A COMMON RESOURCE BY A DUPLEX PLURALITY OF CENTRAL PROCESSING UNITS

BACKGROUND OF THE INVENTION (1) Field of the Invention

The present invention pertains to multicentral processing unit controlled real time systems and more particularly to an arbitration scheme for resolving conflicting requests from the central processing units for access to a commonly shared resource.

(2) Description of the Prior Art

Computer control has been applied to a vast number of real time process control systems. For example, central processing units (CPUs) control the real time switching operation in modern telephone central offices. Historically, large CPUs have been developed to provide the control function for large telephone central offices.

Due to the public policy of requiring telephone switching centers to operate 24 hours a day continuously without disruption of service, highly reliable switching systems are desirable. This requirement provides added complexity when dealing with CPU common controlled switching systems.

In more recent times, large central processing units have given way to distributed processing schemes. In such schemes, numbers of smaller central processing units cooperate to perform the control functions, thereby increasing the overall flexibility of such a system and providing for modular expansion. In the telephone central office example, many smaller central processor units working together can handle telephone traffic more efficiently and economically than a single large central processing unit. Microprocessor CPUs are specially suited to such an operation.

In distributed processing systems where there are a number of central processing units, these CPUs may typically exchange information in order to perform one overall task. One solution to the information exchange problem is to have two CPUs talk directly to one another. In such a configuration, each CPU must stop any other tasks which it may be performing establish a direct link via a defined protocol scheme and then transmit the required information.

In another solution, the CPUs may asynchronously place information in a predefined resource, so that the CPU which is to receive the information may remove it at its own particular available time. In sharing a common resource, a problem of allocation of the resource to a particular CPU arises. That is, a number of CPUs may request to deposit or retrieve information simultaneously. Therefore, conflicts arise and these conflicts of access must be resolved. Previous access schemes involved scanning signals for request or allocating certain time slots in which each processor may access the resource. Such systems are time consuming and inefficient and further they allow monopolization of the resource by a particular CPU of the group.

Accordingly, it is an object of the present invention to provide an arbitration controller for providing equal priority sharing of a common resource by a duplex plurality of CPUs.

It is a further important objective of the present invention to provide such a controller which prohibits monopolization of the common resource by a particular CPU.

It is another important objective of the present invention to provide for the arbitration of simultaneous access by CPUs at a very rapid rate in order to allow an efficient information exchange.

It is another important objective of the present invention to provide for an approximately statistically equal probability of each CPU for obtaining access to the resource.

It is still another important objective of the present invention to provide for a highly reliable configuration for CPU arbitration in order to prevent switching system disruption due to equipment failure.

It is yet another important objective of the present invention to provide an arbitration controller which may grow in the number of CPUs, which are subject to control, in an efficient and economical manner.

SUMMARY OF THE INVENTION

The present invention comprises an arbitration controller providing for equal priority sharing of a duplicate copy resources by a duplex plurality of CPUs. These CPUs communicate with one another by transmitting information asynchronously to the common resource and retrieving information deposited therein by the other CPUs. One resource, comprising two identical copies, can operate with only one CPU at one time. Therefore, each active CPU is connected to a duplex pair of arbitration circuits and the connections between each CPU and these arbitration circuits each comprise a tri-state bus arrangement. Each arbitration circuit is connected to a corresponding copy of the resource via a separate common tri-state bus.

The arbitration circuits comprise two parallel arbitration groups operating synchronously. Within a group, each arbitration circuit is connected to the next successive arbitration circuit, with the last arbitration circuit being connected to the first, thereby forming a ring connection. An initialization signal is applied to the first arbitration circuit and a bus available signal is derived from it and is propagated along the ring connection in a circular of fashion. When a CPU requests an access to the common resource, a signal is transmitted via the tri-state bus between the CPU and a corresponding arbitration circuit in each arbitration group. Since the bus available signal moves along the completed ring connection at a high rate of speed, in a very short time the bus available signal will enter the logic of the arbitration circuit corresponding to the CPU which has made the common resource request. The signals are synchronously analyzed by the arbitration circuit of each group and the requesting CPU is given access to both common tri-state buses connected to the respective copies of the common resource. The CPU then proceeds with the information exchange and other CPUs must wait.

When two or more CPUs simultaneously request access to the common resource, the next CPU which has an active common resource request and sequentially obtains the bus available signal will gain control of the duplicate common resources. The bus available signal travels at a high rate of speed slowed only by a single gate propagation time, if no requests for the common resource are active. The probability of any CPU gaining access to the common resource is statistically equal to that of any other CPU. Each CPU of the duplex pair is allowed only one access cycle to the common resource and then must relinquish control of the resource. In this way, one CPU is prohibited from monopolizing the resource for a long period of time.

After the completion of one access cycle to the common resource, other CPUs will sequentially be granted the access to the resource. If other CPUs have active requests, they will be serviced in a sequential fashion similar to that as described above.

While one CPU is accessing the resource, and if no other CPUs had active common bus request signals, the bus available signal will propagate along the ring connection and back to the CPU which is currently accessing the resource. The propagation of the bus available signal will not be halted, because other common bus request signals may have become active in the intervening propagation time. Therefore, the arbitration circuit will re-propagate the bus available signal, so that the next common bus request can be established simultaneously with the processing of the current resource access. In addition, this scheme of re-propagating the bus available signal prevents a particular CPU from making two consecutive resource accesses.

If the bus available signal returns to the arbitration circuit making a resource access, a take grant signal is generated to automatically allow the next sequential arbitration circuit to access the resource if it has an active request. This take grant signal is important when no other CPUs have an active request because it prevents one arbitration circuit from multiple consecutive accesses and distributes determination of which is the next available resource request to be given access on a rotational basis. This scheme keeps resource access equal when CPU requests are few and sporadic.

Optionally, each arbitration circuit provides its associated CPU with the ability to hold the access of the resource for more than one cycle.

Each CPU of the plurality has an associated ready-standby CPU. Only one of the duplex pair is active at one time. The other CPU is ready to become active should a fault occur in the active CPU. Both CPUs of the duplex pair have full access to each copy of the resource via cross connection of the tri-state buses between the CPUs and the two parallel rings of arbitration circuits.

Operation of each arbitration group and each copy of the resource are synchronized, so that the integrity of information stored or retrieved from memory is maintained.

DESCRIPTION OF THE PREFERRED EMBODIMENT

Figure 1:
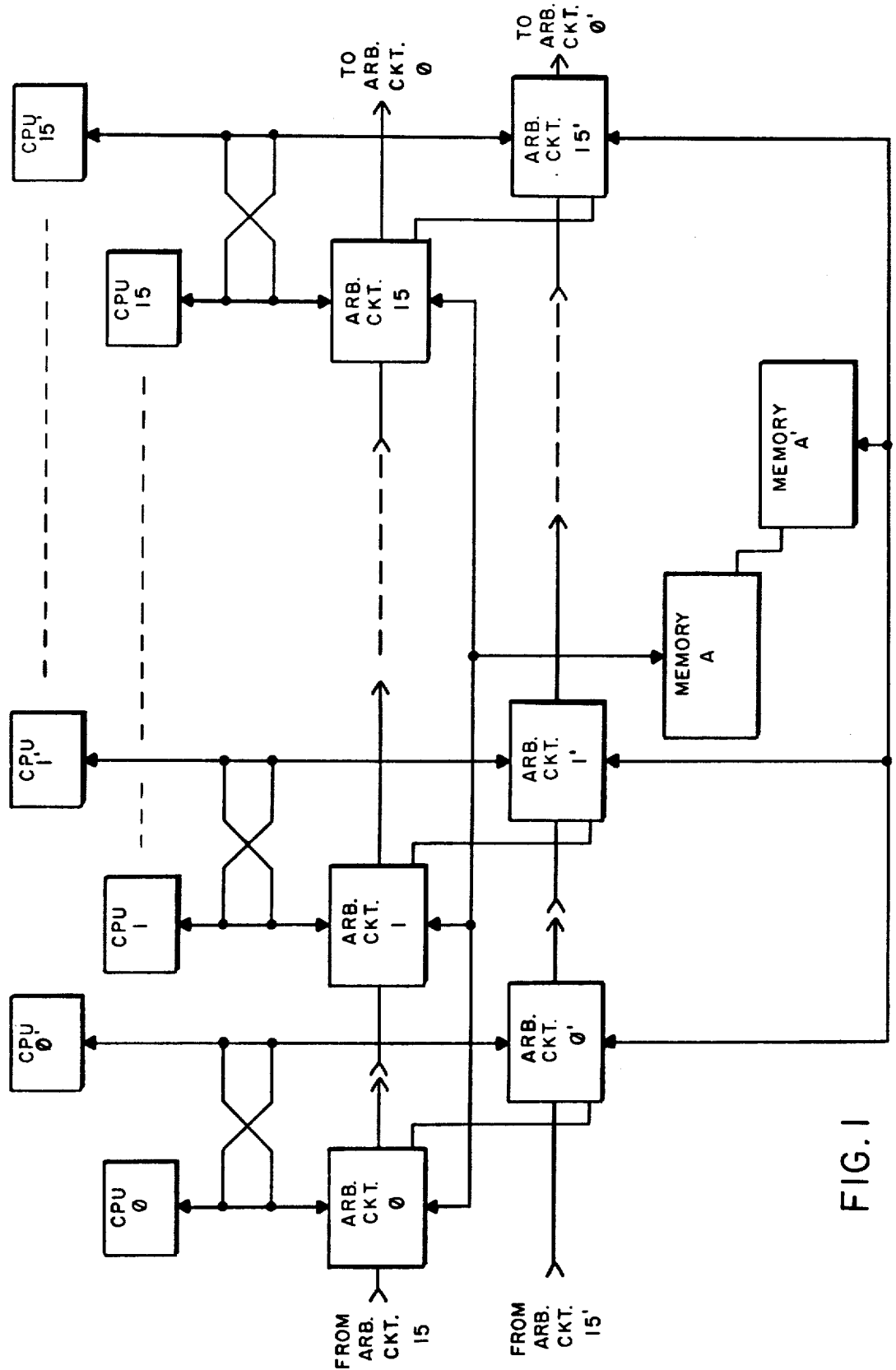
FIG. 1 is a block diagram of an arbitration controller providing equal priority sharing of a duplicate copy common resource by a duplex plurality of CPUs.

Referring to FIG. 1, an arbitration controller apparatus is shown, such apparatus being shown in a duplex form. The present application teaches duplex arbitration control. Simplex arbitration control is taught in co-pending sister application Ser. No. 163,049.

Each central processing unit (CPU) 0-15 and 0'-15' is shown connected via a tri-state bus to a corresponding arbitration circuit 0-15 and 0'-15' respectively. CPUs 0 and 0', 1 and 1', etc. constitute duplex pairs, having one CPU of the pair active and the other a ready-standby for fault failure of the active one. Each CPU of the pair has its buses cross connected to the other of the pair. However, only one CPU of the pair is active at one time. The buses are enabled only from the active CPU via tristate driver elements. Each arbitration circuit 0-15 and 0'-15' is in turn connected via a corresponding common tri-state bus to memory A and to its duplicate copy memory A'. Arbitration circuit 0 is connected to arbitration circuit 1 with arbitration circuit 1 being connected to the next successive arbitration circuit and the last arbitration circuit connected back again to arbitration circuit 0, thereby forming a completed ring connection. Arbitration circuit 0' is connected to arbitration circuit 1' with arbitration circuit 1' being connected to the last prime arbitration circuit and the last prime arbitration circuit connected back again to arbitration circuit 0', thereby forming a second parallel and synchronously operated ring connection. There is an exact correspondence between each group of arbitration circuits. The number of arbitration circuits of each ring connection is in direction relation to the number of CPUs in the configuration.

The configuration may contain as many as 16 pairs of central processing units (each may comprise an INTEL 8086 or similar device) and therefore, 16 pairs of arbitration circuits. The number of CPUs is expandable from 1 pair to a total of 16 pairs in this implementation. As a practical matter, at least two pairs of CPUs are required for the function of telephone central office switching. It should be noted that if the configuration contained only one pair of CPUs there would be no need for arbitration circuits since memory A and A' would be accessible on a full time basis to CPU 0 and CPU 0'.

When an initialization signal is applied to arbitration circuit 0 and 0'0 parallel bus available signals are derived and each is propagated along to successive arbitration circuits of its group ultimately returning to arbitration circuit 0 and 0' where it is again propagated. When, for example, CPU 0 requests access to memory A and A', arbitration circuit 0 and 0' each receive a request signal via their respective buses. And as the bus available signal is propagating through the logic of arbitration circuit 0 and synchronously through the logic of arbitration circuit 0', arbitration circuit 0 and 0' will each temporarily block the propagation of the bus available signal. As a result, CPU 0 will have control of each of the common buses between the arbitration circuits 0 and 0' and can access memory A and A'0 synchronously. CPU 0 then performs parallel memory accesses to memories A and A' of a duration of one memory cycle while simultaneously re-propagating the bus available signal in each ring connection to the next sequential arbitration circuit 1 and 1'.

The bus available signals travel along each ring connection of arbitration circuits 0-15 and 0'-15' at a relatively high rate of speed, so that the probability of any active CPU gaining access to memory A and A' is relatively equal among the active CPUs. Each arbitration circuit slows the propagation of the bus available signal only by the time required to propagate this signal through a high speed gating arrangement of each ring connection.

When two or more active CPUs of duplex pairs of simultaneously request access to memory A and A', a conflict situation arises. This conflict is arbitrated by means of the two parallel ring connections of arbitration circuits. The bus available signal propagates along each ring connection of arbitration circuits. If an arbitration circuit pair (0 and 0') has an active request for access to the common bus of memory A and A', CPU 0 associated with these arbitration circuits is then given control of each common bus enabling the memory transfer to occur. IF CPU 0' is active the transfer will occur as above except that CPU 0 is relaced by CPU 0'.

During this time, each bus available signal is re-propagated to the next succeeding arbitration circuit pair 1 and 1' of each ring, so that CPUs 1 or 1' may establish their priority to obtain the common buses next. The associated CPU of this arbitration circuit pair then has control of each common bus and associated memory A and A'. Then the active CPU of the duplex pair performs its memory transfer operation. The arbitration occurs sequentially as described above until all outstanding requests for access to memory A and A' have been serviced.

While a particular CPU has been granted access to memory A and A', the bus available signals will be re-propagated by each of its corresponding arbitration circuits. Other active CPUs will have the opportunity to establish a priority for service before a memory request will be granted to the same CPU. If the bus available signal returns to the arbitration circuit pair presently in control of the duplicate memories, grant signals will automatically pass control of the grant of access to the next sequential arbitration circuit pair. Thereby, a particular active CPU does not utilize its arbitration circuit to monopolize memory A and A'.

However, optionally each active CPU of a duplex pair may lockout other active CPUs for more than one memory cycle. Such conditions are limited and closely monitored.

Figure 2:
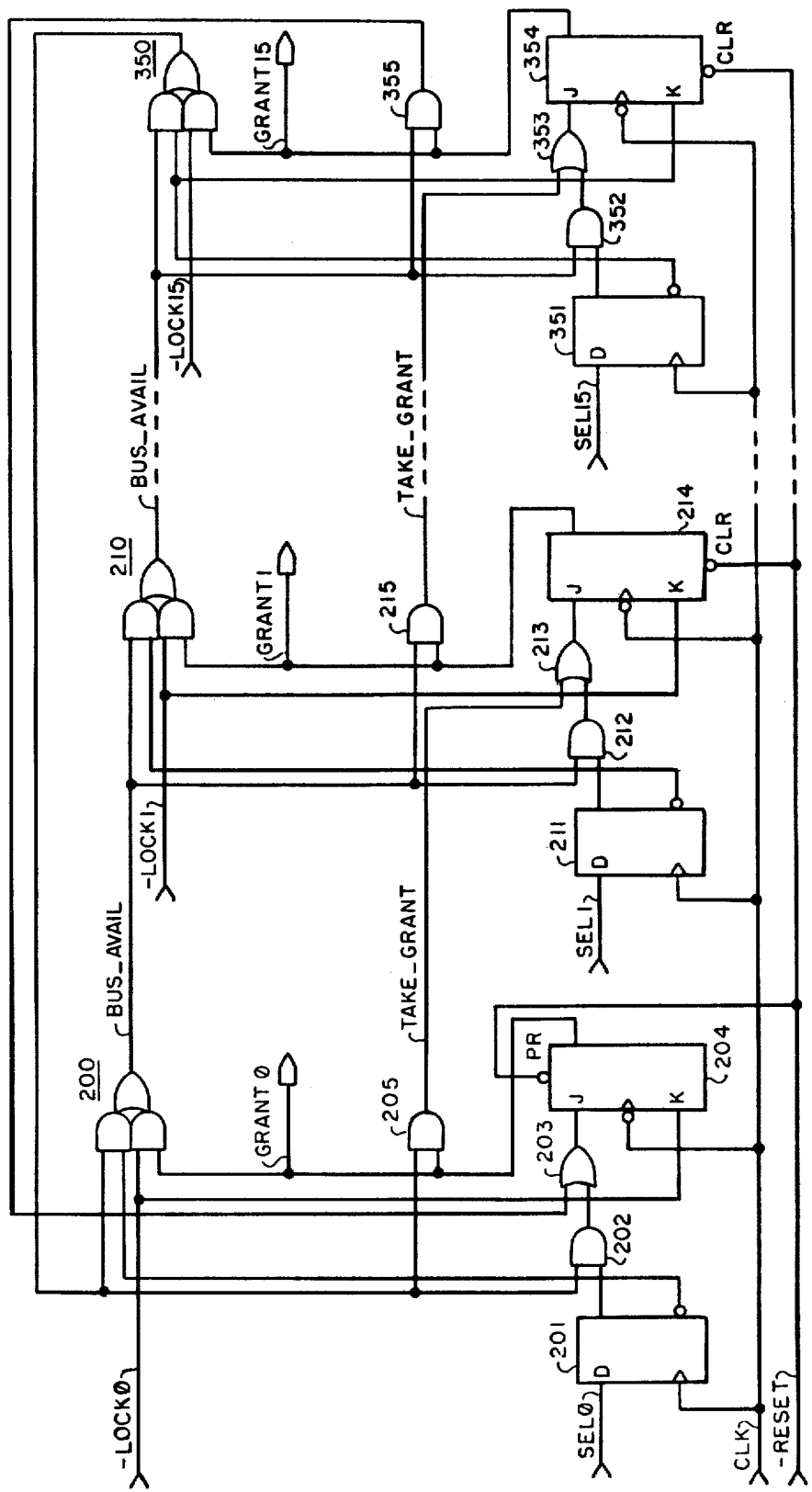
FIG. 2 is a schematic diagram of an arbitration circuit embodying the principles of operation of the present invention.

Referring now to FIG. 2, a schematic diagram of three arbitration circuits of one group is shown. These circuits correspond to a first, a second and a last arbitration circuit of one of the two parallel ring connections. A particular implementation may include up to 16 pair of arbitration circuits, one pair for each CPU air equipped in the configuration. The operation will be explained for one arbitration group or ring connection for simplicity. It is to be noted the same operation synchronously occurs in a corresponding parallel arbitration group. Thereby, both memory copies A and A' are written to or read from simultaneously. In the operation either CPU of the pair may be active, for example, CPU 0 or 0'.

Each arbitration circuit includes a gating arrangement composed of an AND-OR gate 200, which may be implemented via an integrated circuit part number 74S51 or similar device. A ring connection of gates 200, 210, etc. propagates the bus-avail signal from one arbitration circuit to the next at a relatively high rate of speed so that the signal is not inhibited by any single arbitration circuit for a substantial period of time.

D-Type flip-flop 201, 211 and 351 are each connected between a respective CPU and its respective arbitration logic. Gates 201, etc. may be implemented via integrated circuit part number 74S74. JK flip-flop 204, 214, etc. are each connected between their corresponding D-type flip-flops 201, 211, etc. and their corresponding AND-OR gate 200, 210, etc.

As a portion of the system clear and initialization, CPU 0 pluses the reset lead which is connected to JK flip-flops 204, 214, etc. As a result the bus-avail signal is generated through AND-OR gate 200 and propagates along the ring connection to AND-OR gate 210, 350 and back gain to gate 200. A clock signal, taken from the memory clock of 8 MHZ, is transmitted to all flip-flops (D-type and JK) via the CLK lead to operate each of these flip-flops.

An example will best serve to illustrate the granting of control of the common bus to a particular CPU. When active CPU 0 signals via the reset lead, flip-flop 204 is preset enabling gate 200 to transmit the bus available signal via the bus-avail lead to each successive gate 210, etc. When CPU 0 requests access to the common memory, CPU 0 raises the SEL 0 lead via the bus connected between CPU 0 and arbitration circuit 0. At the next clock cycle, the clock signal is transmitted to flip-flop 201 which becomes set and the Q output of this flip-flop temporarily disables gate 200 from passing the bus-avail signal. The Q output of flip-flop 201 is passed through gates 202 and 203 and sets flip-flop 204, which causes it to toggle and produce a signal on the grant 0 lead and simultaneously enables gate 205. The grant 0 lead is returned to CPUs 0 and 0' and this signal also enables tri-state elements (not shown), gating CPU 0 bus onto the common bus of memory A. The above simultaneously occurs in arbitration circuit 0'. While this memory access takes place, the bus available signal is re-propagated via the output of J-K flip-flop 204 through the lower portion of gate 200, so that the successive arbitration circuits may establish their respective priority for memory access.

If the bus available signal returns to arbitration circuit 0 via the bus-avail lead while the access is in progress, the grant signal is transmitted via the take-grant lead automatically to the next sequential arbitration circuit 1, so that if SEL 1 is set, CPU 1 access request will be given the grant on the next clock cycle. This scheme distributes determination of which is the next available memory request to be given access on a rotational basis; and this scheme further keeps memory access equal when CPU access requests are sporadic. In this way, a CPU may not make successive memory requests.

CPU 0 may now completes its data transfer to memory A and A'. If another arbitration circuit pair has established its priority, that circuit pair will receive control of the common buses next. In this way, while one CPU is accessing memories A and A', the next CPU is establishing its priority for service.

All buses are bidirectional and each directional link includes tri-state bus drivers which may be implemented via integrated circuit part number 74LS245. All above mentioned integrated circuits are manufactured by Texas Instruments Incorporated and various other manufacturers.

The CPU having the memory access grant may signal via the lock lead (normally high) to halt the re-propagation of the bus available signal and thereby hold memory access for longer than one cycle. This optional use is a rare circumstance and is closely monitored by the CPUs.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An arbitration controller providing for equal priority sharing of duplicate copy resources by active ones of a plurality of duplicate pairs of CPUs, said arbitration controller comprising:

first and second means for initialization, each providing a first signal;

corresponding first and second pluralities of arbitration circuits, each plurality including a first, at least one successive and a last arbitration circuit;

each of said means for initialization connected to at least one of said corresponding plurality of arbitration circuits;

first and second pluralities of CPU buses each bus of each plurality connected between a particular CPU and said resources via a particular arbitration circuit on a one for one basis, each CPU bus including a control portion and an address/data portion;

each of said CPU buses of said first plurality connected to a particular one of said buses of said second plurality and each of said buses of said second plurality connected to a particular one of said buses of said first plurality;

first and second common buses, each common bus connected between said corresponding CPU and a particular one of said duplicate copies of said resource via said corresponding plurality of arbitration circuits for the parallel transmission of information between said duplicate common resources and any active one of said plurality of CPUs via said address/data portion of said corresponding CPU bus;

first and second pluralities of circuit connections, each plurality including a circuit connection between each first arbitration circuit and each successive arbitration circuit, said last arbitration circuit connected to said first arbitration circuit, thereby forming corresponding first and second completed ring connections, each of said ring connections propagating a corresponding one of said first signals through said first and second ring connections;

one arbitration circuit of each plurality connected to said control portion of said corresponding CPU bus and simultaneously operated in response to its respective first signal and to a common bus request signal from said active CPU, each arbitration circuit producing a second signal for allowing said active CPU to access each of said duplicate copy resources simultaneously via said first and said second common buses respectively;

each said arbitration circuit of each said plurality including:

first gating means operated to propagate said first signal along said corresponding ring connection at a relatively high rate of speed;

latching means operated in response to said common bus request signal of said corresponding CPU to produce said second signal for allowing said CPU to access said duplicate resources via said common and CPU buses;

second gating means operated in response to said operated latching means and in response to aid propagated first signal to propagate a third signal from each arbitration circuit of each plurality to each successive arbitration circuit; and said first signal of each said plurality of arbitration circuits propagating through said ring connection to successively enable said active CPU access to said duplicate copy resources via said common bus, while said third signal permitting said successive arbitration circuits of each said plurality to establish priority for subsequent access of said duplicate copy resources simulaneously with a present access of said resources.

2. An arbitration controller as claimed in claim 1, wherein: each of said arbitration circuits has its first and second gating means interconnected whereby each active CPU is given an equal priority access to said resource by inhibiting said propagation of said corresponding first signal.

3. An arbitration controller as claimed in claim 2, wherein: said first gating means is further connected to said particular CPU whereby said CPU exclusively controls access to said duplicate copy resources.

4. An arbitration controller as claimed in claim 1, wherein: each of said duplicate pairs of CPUs includes a first and a second CPU cross connected, said first CPU connected to a bus of said first plurality and to a bus of said second plurality and said second CPU connected to a bus of said second plurality and to a bus of said first plurality whereby said first CPU constitutes said active CPU and said second CPU constitutes a ready-standby CPU.

5. An arbitration controller as claimed in claim 1, wherein: each of said first and second corresponding pluralities of arbitration circuits is connected to a clock for synchronously operating each arbitration circuit of said first plurality with said corresponding arbitration circuit of said second plurality whereby each of said active CPUs is enabled to access either copy of said duplicate resource.

6. An arbitration controller as claimed in claim 5, wherein: each copy of said duplicate copy resources is connected to said clock and to said other copy resource whereby each of said active CPUs access both copies of said resource synchronously.

7. An arbitration controller as claimed in claim 5, wherein: said latching means includes first and second flip-flops, said first flip-flop connected between said corresponding CPU and said second flip-flop, said second flip-flop connected to said first and said second gating means of said arbitration circuit, whereby said common bus request signal of said corresponding CPU is stored for arbitration.

8. An arbitration controller as claimed in claim 7, wherein: each of said flip-flops of each arbitration circuit includes a connection to said clock adapted to drive each of said flip-flops.

* * * * *